2,967,886
AMIDES OF d-a-METHYLPHENETHYLAMINE

Seymour L. Shapiro, Hastings-on-Hudson, and Louis Freedman, Bronxville, N.Y., assignors to U.S. Vitamin & Pharmaceutical Corporation, a corporation of Delaware No Drawing. Filed July 17, 1957, Ser. No. 672,355

6 Claims. (Cl. 260—562)

This invention relates to amides of a d-a-methylphenethylamine. More particularly it pertains to amides produced by reaction with a-hydroxy acids, and a-oxyacids and includes correlated improvements and discoveries relative to such compounds and compositions containing them.

An object of the invention is the provision of amides of d-a-methylphenethylamine that are characterized by distinctive physiological activity.

A further object of the invention is to provide amides of d-a-methylphenethylamine which have an excitory effect; are of low toxicity and without undesirable cardiovascular side effects, such as increasing blood pressure.

Another object of the invention is the provision of amides of d-a-methylphenethylamine which may be prepared readily, efficiently and economically.

A particular object of the invention is to provide amides of d-a-methylphenethylamine which are produced by reaction thereof with hydroxyl derivatives of a low molecular weight aliphatic acid, for example, glycolic and lactic acids.

Other objects of the invention will in part be obvious and will in part appear hereinafter.

The invention accordingly comprises a composition of matter possessing the characteristics, properties, and the relation of components which will be exemplified in the composition hereinafter described, and the scope of the invention will be indicated in the claims.

The novel amides of d-a-methylphenethylamine comprise acidyl radicals represented particularly by the formula:

$$C_6H_5-CH_2-\underset{H}{\overset{CH_3}{\underset{|}{C}}}-N-\overset{O}{\overset{\|}{C}}-\underset{O-R_1}{\overset{H}{\underset{|}{C}}}-R$$

wherein R is a member of the group consisting of hydrogen and lower alkyl, said alkyl containing 1–4 carbon atoms, and $R_1$ is a member of the group consisting of H, lower alkyl, lower alkenyl having 3 carbon atoms, e.g., allyl, and aralkyl, e.g., benzyl.

The aromatic groups in the $R_1$ benzyl, categories in turn may be substituted, or unsubstituted and are considered as coming within the scope and spirit of this invention.

Although we have used dl lactic acid, and the dl forms of the a-oxypropionic acids, such as a-methoxypropionic acid; the optical isomers of these forms of the acid concerned are also capable of being used.

The required reactant a-hydroxy acids, and a-oxyacids, or their respective esters and acid chlorides were commercially available, or were accessible by procedures described in the literature.

Table I describes the properties of the reactant a-oxy derivatives which were used; which were not commercially accessible.

TABLE I $$R-\underset{\underset{O R_1}{|}}{\overset{\overset{H}{|}}{C}}-\overset{O}{\overset{\|}{C}}-R_2$$

$R_2=OH=$Acid  
$R_2=OC_2H_5=$Esters  
$R_2=Cl=$Acid chloride a-oxy acids and their derivatives

| $R_1$ | R | $R_2$ | M.P. or B.P./mm. pressure | Literature Reference |
|---|---|---|---|---|
| $C_2H_5$ | H | $OC_2H_5$ | 56/17 | McElvain et al. J. Am. Chem. Soc. 73 1400 (1951). |
| Allyl | H | OH | 104–128/9 | Evans et al. J. Chem. Soc. 244, (1949). |
| $C_6H_5CH_2$ | H | OH | 120–122/0.1 | Rothstein. Bull soc. chim. 51 691, (1932). |
| $CH_3$ | $CH_3$ | OH | 84/10 | Nieman et al. J. Org. Chem. 8 397, (1943). |
| $CH_3$ | $CH_3$ | Cl | 38–58/90 | Do. |
| $C_2H_5$ | $CH_3$ | $OC_2H_5$ | 56/17 | Karvonen, Ann. Acad. Sci. Fenn 10 No. 6 S. 14. |
| Allyl | $CH_3$ | OH | 104–106/10 | |
| $C_6H_5CH_2$ | $CH_3$ | OH | 118–120/0.15 | Levene et al. J. Biol. Chem. 113 153 (1936). |
| $C_6H_5CH_2$ | $CH_3$ | Cl | 68/0.12 | Do. |

Table II illustrates various compounds, or amides of d-a-methylphenethylamine that have been prepared.

TABLE II

Amides of d-a-methylphenethylamine $$C_6H_5-CH_2-\underset{CH_3}{\overset{H}{\underset{|}{C}}}-\overset{H}{\underset{|}{N}}-\overset{O}{\overset{\|}{C}}-\underset{O-R_1}{\overset{H}{\underset{|}{C}}}-R$$

| No. | R | $R_1$ | M.P. | B.P./mm. press. | Formula | Method* |
|---|---|---|---|---|---|---|
| 1 | H | H | | 156–9/0.04 | $C_{11}H_{15}NO_2$ | C |
| 2 | $CH_3$ | H | 52–53 | | $C_{12}H_{17}NO_2$ | C |
| 3 a | $CH_3$ | H | | 140/0.2 | $C_{12}H_{17}NO_2$ | C |
| 4 b | $CH_3$ | H | | 149/0.15 | $C_{12}H_{17}NO_2$ | C |
| 5 | H | $CH_3$ | | 114/0.08 | $C_{12}H_{17}NO_2$ | C |
| 6 | H | $C_2H_5$ | | 106–108/0.08 | $C_{13}H_{19}NO_2$ | C |
| 7 | H | $C_3H_5$ d | | 132–136/0.15 | $C_{14}H_{19}NO_2$ | A |
| 8 | H | $C_6H_5CH_2$ | 46–47 | | $C_{18}H_{21}NO_2$ | A |
| 9 | $CH_3$ | $CH_3$ | | 110–112/ 0.12–0.14 | $C_{13}H_{19}NO_2$ | B |
| 10 | $CH_3$ | $C_2H_5$ | | 98/0.1 | $C_{14}H_{21}NO_2$ | A |
| 11 | $CH_3$ | $C_3H_5$ d | | 108/0.12 | $C_{15}H_{21}NO_2$ | B |
| 12 | $CH_3$ | $CH_2C_6H_5$ | | 154–166/0.1 | $C_{19}H_{23}NO_2$ | B | a Prepared from dl-a-methylphenethylamine.  
b Prepared from l-a-methylphenethylamine.  
* Method A—used acid; B—used acid chloride; C—used ester.  
d $C_3H_5=$allyl.

As an illustrative embodiment of a manner in which the amides of d-a-methylphenethylamine may be prepared the following examples are given:

EXAMPLE 1.—LACTAMIDE OF d-a-METHYLPHENETHYLAMINE

A mixture of 135.2 g. of d-a-methylphenethylamine and 120 ml. of ethyl lactate are refluxed. After 15 hours the initial reflux temperature of 159° C. is decreased to 115° C. by the formed ethanol of reaction. The condenser is replaced by a Vigreaux column and 41 ml. of ethanol distilled, and with the internal temperature reaching 183° C. The column was replaced by a condenser and the reaction refluxed for 7 hours. The reaction mixture was then subjected to distillation. About 10 g. of unreacted amine are initially obtained and the product, the lactamide of d-a-methylphenethylamine, distilled 146°–153° C./.200–.280 mm. The product solidified on seeding, M.P. 47–48° C.

The product so obtained dissolved in 10 volumes of boiling hexane is diluted with 3 volumes of ethyl acetate. As the solution cools it clouds, and ethylacetate is added to maintain only faint cloudiness until room temperature is reached. The solution is treated with charcoal and filtered. The filtrate is cooled and the product crystallizes. The crystals are filtered, rinsed with cold 10% ethyl acetate in hexane, and then with hexane. The crystals are air-dried and finally dried in a vacuum desiccator. The product had a M.P. of 52–53° C.

EXAMPLE 2.—LACTAMIDE OF d-a-METHYLPHENETHYLAMINE

To 7.2 g. of lactide, add 15 g. of d-a-methylphenethylamine. Heat to solution and place in an oil bath at 140° C. for 4 hours. Excess amine is removed at 0.01–0.015 mm. (bath 98–150° C.). The residue, i.e., the product, then distilled at 134° C./0.01 mm. (bath 220° C.). The lactamide of d-a-methylphenethylamine solidified on seeding. This product is identical with that obtained in Example 1 and may be recrystallized as described in Example 1.

EXAMPLE 3.—GLYCOLAMIDE OF d-a-METHYLPHENETHYLAMINE

A mixture of 20 g. of d-a-methylphenethylamine and 20 ml. of ethyl glycolate was heated under reflux. After 3 hours the initial reflux temperature of 127° C. is decreased to 108° C. by the formed ethanol of the reaction.

The reaction mixture was stripped of low boiling products under vacuum until the vapor temperature reached 140° C. at 40 mm. (bath 231° C.). The residue was collected at B.P. 156–159° C./0.04 mm. (bath 220–225° C.). There is thus obtained the glycolamide of d-a-methylphenethylamine.

EXAMPLE 4.—dl-a-BENZYLOXPROPIONIC ACID AND ITS ACID CHLORIDE

A solution of 11.5 g. (0.5 mole) of sodium in 250 ml. of benzyl alcohol was heated to 150° C. and a solution of 27.2 g. (0.25 mole) of a-chloropropionic acid in 35 ml. of benzyl alcohol was added with stirring over 35 min. while maintaining the temperature at 150° C. Stirring and heating were continued for 2 hrs. after the addition was complete. After cooling, the benzyl alcohol was removed at 65° C./2 mm. and the residue dissolved in 200 ml. of water. The solution was washed with two 100 ml. portions of ether, acidified with 23 ml. of concentrated hydrochloric acid and extracted twice with 100 ml. portions of benzene. The combined extracts were treated with charcoal and filtered and the benzene removed on a hot plate to 120° C. internal temperature. The residue was distilled in vacuo and after removal of 2 g. of forerun the acid distilled at 118–120° C. at 0.15 mm.

A solution of 18.0 g. (0.10 mole) of dl-a-benzyloxypropionic acid, 14.5 ml. (0.20 mole) of thionyl chloride and 25 ml. of chloroform was heated under reflux for 90 minutes. The chloroform and excess thionyl chloride were then removed at 15 mm. pressure and the residue distilled in vacuo yielding the acid chloride boiling at 68° C. at 0.12 mm.

EXAMPLE 5.—a-ALLYLOXYPROPIONAMIDE OF d-a-METHYLPHENETHYLAMINE

Over 16 hours 1.4 ml. (theoretical amount) of water was removed by azeotropic distillation, from a refluxing solution of 9.1 g. (0.070 mole) of dl-a-allyloxypropionic acid, 9.46 g. (0.070 mole) of d-a-methylphenethylamine and 100 ml. of xylene. The cooled xylene solution was washed with dilute hydrochloric acid, water, dilute sodium hydroxide solution, water and filtered. The xylene was removed at 45° C. at 30 mm., and the residue was distilled in vacuo. After removal of low boiling materials and a small forerun, the product distilled at 108° C. at 0.12 mm.

EXAMPLE 6.—a-METHOXY ACETAMIDE OF d-a-METHYLPHENETHYLAMINE

A solution of 10.4 g. (0.10 mole) of methyl methoxy acetate and 15 ml. (slight excess) of d-a-methylphenethylamine was heated under reflux for 4 hours. The formed methanol, and low boiling materials were removed until internal temperature reached 180° C. On cooling, the residue was taken up in 100 ml. of ether, a small amount of solid removed, the ether evaporated in the steam bath and the residue distilled in vacuo. After removal of unreacted starting materials and a small forerun, the product was obtained at 114° C. at 0.080 mm.

The unique character of the simple amides of d-a-methylphenethylamine is evident when the compound 2 is compared with the dl and l compounds 3 and 4 as shown in Table III.

The individual compounds were evaluated in rats in activity cages. The excitory action is registered on a counter and kymograph responsive to motion. Each of the compounds was tested at 10 mg./kg. subcutaneously and evaluated in six rats, with six additional rats serving as controls during intervals from 5 p.m. to 9 a.m. the next day. The activity is expressed by the formula Percent increase in activity $$= \frac{\text{activity test group}}{\text{activity control group}} \times 100$$

As a comparison, the familiar drug, "Benzedrine" was used. The LD min. is the minimum lethal dose as established in mice.

TABLE III

| No. | Percent increase in activity | LD min. |
|---|---|---|
| 1 | 440 | 400 |
| 2 | 230 | 250 |
| 3 | 66 | |
| 4 | 0 | |
| 5 | [1] 500 | 250 |
| 6 | [2] 235 | 400 |
| 7 | [1] 662 | 300 |
| 8 | [1] 321 | 200 |
| 9 | [1] 437 | 400 |
| 12 | [1] 193 | 450 |
| Benzedrine | 534 | 75 |

[1] Tested at 20 mg./kg. subcutaneously.
[2] Tested at 20 mg./kg. orally.

It will be noted that the compounds are substantially less toxic than benzedrine (⅓ to ⅕) yet when tested for activity response at the same dosage level as "Benzedrine" show values ranging from equal to ½ that of benzedrine. Some of the higher molecular weight compounds which have molecular weights almost twice that of benzedrine were evaluated at 20 mg./kg.

Compounds 1 and 2 did not show the cardiovascular effects typical of benzedrine, or of the equivalents of 2, namely 3, and 4 derived from dl-a-methylphenethylamine and l-a-methylphenethylamine.

Additional evidence of lack of toxicity and the anorexogenic properties of these compounds was demonstrated by a subacute toxicity test conducted with the lactamide of d-a-methylphenethylamine. Groups of growing rats were given 2 and 10 mg./kg./day of the compound for three weeks. No untoward symptoms were observed.

Although the compounds of this invention are effective in small dosages, doses of at least 25 mg. are preferred.

While the compound may be administered parenterally, the preferred mode of administration from the standpoint of therapeutic convenience is per os.

It is desirable that the compound be combined with an excipient. The proportion of the excipient should be at least sufficient to separate the particles of the compound from each other and to effect quick solution or dispersion thereof in the gastric juices of the stomach. The excipient must be a non-toxic, edible and potable solid, and chemically inert to the amide of d-a-methylphenethylamine. Solid excipients that may be used are lactose, sucrose, starch, pre-gelatinized starch, gum arabic, gum tragacanth, gum acacia, and mixtures of these. Suitably, the solid excipient may be in admixture with magnesium stearate, talc, corn starch or mixtures thereof to promote separation of the composition from the apparatus used in shaping the composition, e.g., into tablets.

Table IV gives an illustrative embodiment of a suitable composition for tableting.

TABLE IV

| Ingredient | Weight in Mgs. |
|---|---|
| d-a-methylphenethylamine lactamide | 25.0 |
| Sugar | 100.0 |
| Starch | 22.1 |
| Acacia | 7.8 |
| Talc | 3.1 |
| Magnesium Stearate | 1.5 |
| Stearic Acid | 1.6 |

The active ingredient, i.e., the amide, is mixed with the sugar and the gum acacia and then with the starch made previously into a paste with a small amount of distilled water. This mixture is then dried at a low heat and put through a granulator which converts the mix into a granular powder. It is then blended with the talc, magnesium stearate and stearic acid acting as mold lubricants. The whole is now mixed in, e.g., a pony mixer and is then ready for tableting or for filling into hard gelatin capsules.

The compounds of this invention, as shown above, have been found to be therapeutically active with respect to stimulation of the central nervous system without undesirable cardiovascular effects such as inducing a rise in blood pressure, or cardiac arrhythmias.

"Amphetamine" is one of the most potent amines having stimulant action on the central nervous system and this property has been applied in a number of therapeutic applications. Thus, "Amphetamine" has been used as an excitant; a mental stimulant, to inhibit fatigue; an analeptic, and in weight reduction. However, associated with these useful properties the overall value of "Amphetamine" as a therapeutic agent is limited by concomitant undesirable cardiovascular effects such as causing a rise in blood pressure; cardiac arrhythmias; precordial pain, and palpitations, which are frequently noted with cardiac patients being particularly vulnerable.

It is surprising therefore that the compounds of this invention, wherein the free amino group of d-a-methylphenethylamine is bound as an amide, should retain the central stimulant effect of the amine. Moreover, it is unique that while the desirable central stimulant effects are retained, no undesirable cardiovascular side effects are obtained. Another important and unexpected attribute manifest in the novel compounds is their significantly reduced toxicity when compared with "Amphetamine."

This application is a continuation-in-part of our application Serial No. 573,093, filed March 22, 1956, now abandoned.

It will thus be seen that the objects set forth above, among those made apparent from the preceding description, are efficiently attained and, since certain changes may be made in the above composition of matter without departing from the scope of the invention, it is intended that all matter contained in the above description shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described our invention, what we claim as new and desire to secure by Letters Patent is:

1. As a composition of matter an amide of d-a-methylphenethylamine having the following structural formula:

$$C_6H_5-CH_2-\underset{\underset{H}{|}}{\overset{\overset{CH_3}{|}}{C}}-\underset{H}{\overset{}{N}}-\underset{\underset{O-R_1}{|}}{\overset{\overset{O}{\|}}{C}}-CH-R$$

where R is a member of the group consisting of hydrogen and methyl and $R_1$ is a member of the group consisting of hydrogen, lower alkyl, lower alkenyl, and aralkyl.

2. A composition as defined in claim 1, wherein R is methyl and $R_1$ is hydrogen.
3. A composition as defined in claim 1, wherein R is hydrogen and $R_1$ is allyl.
4. A composition as defined in claim 1, wherein R is hydrogen and $R_1$ is methyl.
5. A composition as defined in claim 1, wherein R is hydrogen and $R_1$ is ethyl.
6. A composition as defined in claim 1, wherein R is methyl and $R_1$ is methyl.

References Cited in the file of this patent

UNITED STATES PATENTS

| | | |
|---|---|---|
| 2,426,885 | Kilgore | Sept. 2, 1947 |
| 2,484,295 | Kilgore | Oct. 11, 1949 |
| 2,490,756 | Kenyon et al. | Dec. 6, 1949 |
| 2,504,427 | Kilgore | Apr. 18, 1950 |
| 2,504,477 | Weber et al. | Apr. 18, 1950 |
| 2,520,551 | Kilgore | Aug. 29, 1950 |
| 2,714,119 | Crounse | July 26, 1955 |
| 2,719,862 | Bruce et al. | Oct. 4, 1955 |
| 2,811,507 | D'Alelio | Oct. 29, 1957 |
| 2,909,467 | Shapiro et al. | Oct. 20, 1959 |

FOREIGN PATENTS

| | | |
|---|---|---|
| 1,075,050 | France | Oct. 12, 1954 |
| 167,957 | Switzerland | June 1, 1934 |

OTHER REFERENCES

Karrer, Organic Chem., 1938 Edition, pp. 87–93.
Fein, J.A.C.S., vol. 75, pp. 2097–2099 (1953).
J.A.C.S., vol. 60, pp. 465–467 (1938).
J.A.C.S., vol. 74, pp. 763–765 (1952).

UNITED STATES PATENT OFFICE
CERTIFICATION OF CORRECTION

Patent No. 2,967,886                      January 10, 1961

Seymour L. Shapiro et al

It is hereby certified that error appears in the above numbered patent requiring correction and that the said Letters Patent should read as corrected below.

Column 3, line 39, for "di" read -- D1 --; line 39, for "BENZYLOXPROPIONIC" read -- BENZYLOXYPROPIONIC .

Signed and sealed this 6th day of June 1961.

(SEAL)
Attest:

ERNEST W. SWIDER
Attesting Officer

DAVID L. LADD
Commissioner of Patents